Aug. 24, 1948.  F. J. GIBBONS  2,447,574
SAFETY CRANKING MEANS FOR HAND WHEELS
OF MACHINE SPINDLES AND THE LIKE
Filed June 15, 1946  2 Sheets-Sheet 1

INVENTOR.
Frank J. Gibbons
BY
Chester A. Williams
Attorney

Aug. 24, 1948.  F. J. GIBBONS  2,447,574
SAFETY CRANKING MEANS FOR HAND WHEELS
OF MACHINE SPINDLES AND THE LIKE
Filed June 15, 1946  2 Sheets-Sheet 2

INVENTOR.
Frank J. Gibbons
BY
Chester A Williams
Attorney

Patented Aug. 24, 1948

2,447,574

UNITED STATES PATENT OFFICE 2,447,574

SAFETY CRANKING MEANS FOR HAND WHEELS OF MACHINE SPINDLES AND THE LIKE

Frank J. Gibbons, Worcester, Mass.; Harry J. Gibbons administrator of said Frank J. Gibbons, deceased Application June 15, 1946, Serial No. 677,072

12 Claims. (Cl. 192—67)

This invention relates in general to cranks such as are used on various types of machine tools and the like for the manual turning or adjustment, usually during periods of idleness of the machine, of spindles or shafts which, in the working of the machine, are driven by power.

The principal object of my invention is to overcome and eliminate the hazards that arise from associating with a power-driven shaft or spindle, any projecting device, such as a handle or crank which is adapted for seizure to obtain a manual turning or adjustment of the shaft. Such hazards affect the operator and also the machine itself and the work on which it operates; for example, with the shaft or spindle revolving under power at high speed such a projecting crank or handle is apt to strike and seriously injure an operator, or catch in his clothes; or at other times such a projecting crank or handle may be accidentally struck in a manner such as to turn the shaft inadvertently, and thereby upset some particular adjustment of the machine elements associated with the shaft.

These and other hazards have not been overcome by previous so-called cranks or hand wheels which usually rely wholly on the action of springs to obtain disengagement of the handle or crank from the shaft or hand wheel, when the former is released by the operator; all such prior devices are rendered uncertain and unreliable by the occurrence of undue frictional resistance and also by the fact that the clutching of the crank or handle with the shaft or hand wheel can be inadvertently effected by accidental striking of, or pressure against, the crank or handle, from some extraneous source.

My invention eliminates these and other shortcomings of previous so-called safety hand cranks or hand wheels by an arrangement and combination of parts which insure de-clutching when the operator's grip on the crank handle is released, and which positively prevents any clutching, except as the operator seizes the crank or handle and swings it, for clutching purposes, into a predetermined angular position, the only position in which clutching, by a further manipulation of the crank or handle, can be achieved.

Other and further objects and advantages of my invention will be made apparent by the following detailed description thereof, taken in connection with the accompanying drawings, in which Fig. 1 represents a front elevation view of my invention showing the crank or handle as occupying its normal inoperative position.

Like reference characters refer to like parts in the different figures.

This application is a continuation-in-part of my copending application, Serial No. 546,689, filed July 26, 1944 now abandoned.

Figures 1, 2:
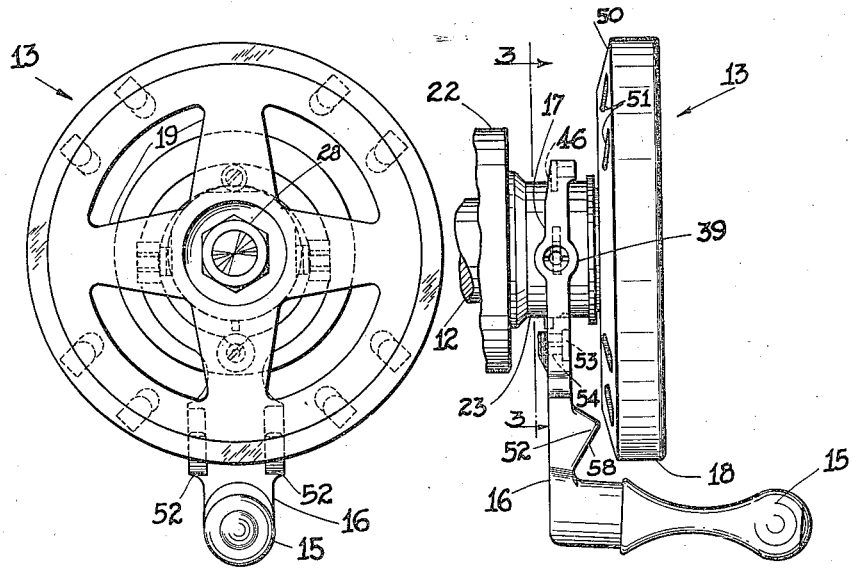
Fig. 2 represents a left side view of the device as disclosed in Fig. 1.
Figure 8:
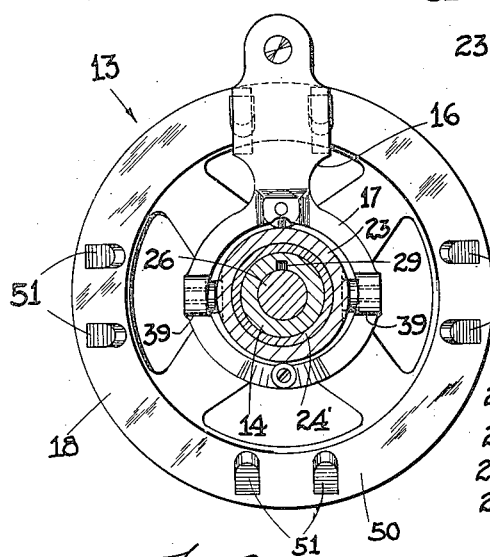
Fig. 8 is a sectional view taken substantially along line 8—8 of Fig. 7.
Figure 11:
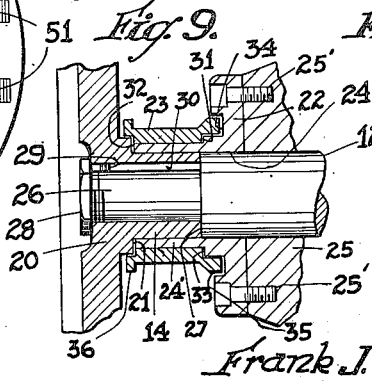
Fig. 11 represents a partial sectional view taken substantially along line 11—11 of Fig. 6.

My invention is readily applicable to the projecting end portion of any machine shaft or spindle, such as that indicated by the numeral 12 of Figs. 2, 8, and 11.

In its preferred embodiment, as shown in the drawings, my invention provides an improved hand wheel and hand assembly which can be applied to such a shaft or spindle 12, in replacement of a conventional hand wheel or other manual turning or cranking device. Such an improved assembly includes a hand wheel 13 having an elongated hollow hub 14 which is keyed to the shaft 12, as best illustrated in Fig. 11. Associated with said hand wheel 13, and adapted to be clutched therewith and unclutched therefrom as hereinafter described, is a protuberant handle member 15 which is scured to the outer end of a radially disposed arm 16, on whose inner end is formed a ring-like enlargement 17 which loosely encircles the hollow hub 14 of wheel 13. Said wheel 13 is here shown as having a circular rim 18 connected by spokes 19 to an enlarged diameter portion 20 of the hub 14, said hub being of a reduced diameter rearwardly from a shoulder 21 for the accommodation of a sleeve 24' and a bushing 23 which are encircled by the ringlike enlargement 17 of the arm 16 and provides the mounting for said handle-carrying arm.

Referring particularly to Fig. 11 the spindle 12 is herein disclosed as being rotatably journaled in an aperture 24 provided in a portion of a quill 22 which is adapted to be secured to a machine frame 25 as by screws 25', 25'. The forward portion of the spindle is reduced as at 26, thus to provide a shoulder portion 27 against which the elongated hub portion 14 is adapted to abut. A nut 28 threaded over the forward portion of the spindle 12 secures the hand wheel 13 fast to the spindle 12. The spindle is provided with a key 29 which extends outwardly therefrom to be received within a keyslot 30 extending longitudinally of the hub 14, thus to prevent relative rotation of the hand wheel 13 and spindle 12. The aforesaid sleeve 24' projects outwardly from and is integral with the quill 22 thus to receive the hollow hub portion 14. Circling this sleeve and supported rotatably thereon is the above noted bushing 23 which is provided with oppositely opposed annular end walls 31 and 32. These sleeve end wells prevent any axial end movement of the sleeve as they are confined between shoulders 33 and 21, respectively, which are provided on the machine part 25 and the hand wheel 13. The quill is provided with an annular undercut groove 34 which receives a shoulder portion 35 of the housing 23 for the purpose of preventing the entry of foreign matter between the bushing 23 and the sleeve 24'. Provided on the other end of the bushing 23 is a second shoulder portion 36 which overlaps the shoulder 21 formed on the hand wheel 13 to the end that foreign matter is prevented from gaining entrance to the relative moving elements by way of this end of the bushing. The connection of arm 16 to the free rotatable outer bushing 23 is one which, while always requiring said parts to have rotation in unison about the axis of shaft 12, is nevertheless of such character that the arm 16 can have limited rocking movement relative to said bushing 23 about an axis substantially at right angles to the shaft axis and also so that the arm 16 can have a limited rectilinear movement in the direction of its radial length relative to the outer bushing 23. To this end, as best shown in Fig. 5, the ring-like enlargment 17 at the inner end of arm 16 which encircles the bushing 23, provides an opening 36 which is circular but of a diameter substantially larger than that of the bushing 23 so as to permit said arm to have a certain amount of radial play, relative to bushing 23.

On this ring-like enlargement 17 is provided, at diametrically opposite points, trunnion devices which secure the attachment of arm 16 to the bushing 23, for the turning of said parts in unison about the axis of shaft 12, and which also permit said arm to have limited rocking movement relative to the bushing, about an axis transverse to the shaft axis.

Figure 4:
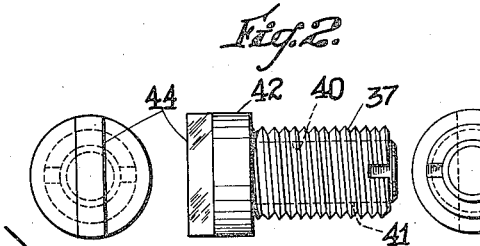
Fig. 4 represents three views of one of the two trunnion devices used in the present device.
Figure 3:
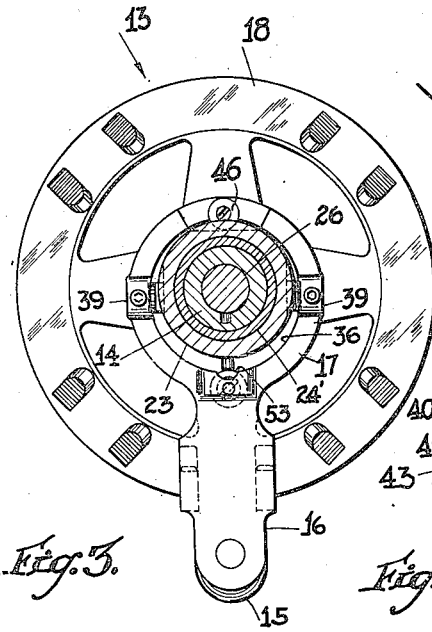
Fig. 3 is a sectional view taken substantially along line 3—3 of Fig. 2.
Figure 5:
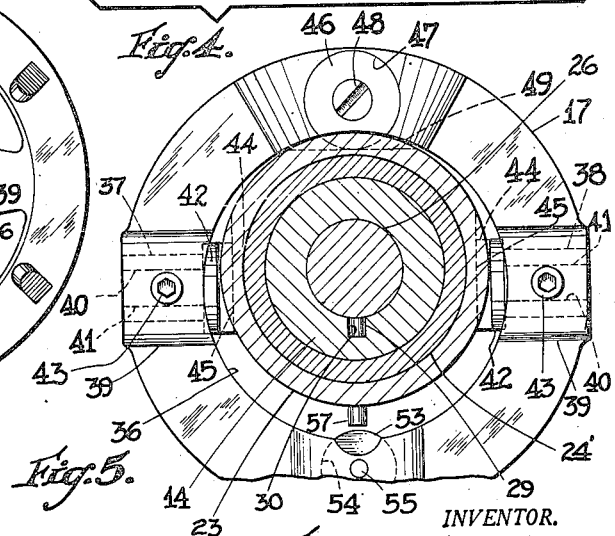
Fig. 5 represents an enlarged view of a portion of the mechanism as disclosed in Fig. 3.

Referring particularly to Figs. 4 and 5, these trunnion devices are here shown as consisting of a pair of externally threaded bushings 37 and 38 which are screwed to the ring-like enlargement 17 within diametrically opposite slightly thickened portions 39 thereof. The bore 40 of each of the bushings 37 and 38 is entered by a stem 41 of a headed member 42. The heads 42, 42 of each of the stems 41, 41 about the inner ends of the bushings 37, 38, the latter being adjustable endwise to determine the radial position of the associated headed members, and being locked in position after such adjustment, by any suitable means, such as set screws 43, 43 which are threaded transversely through the thickened portions 39, 39. The heads of the two members 42, 42 are cut away on their top surfaces at each side, to provide a central relatively narrow diametrical tongue 44, each such tongue 44 being slidably received in a relatively narrow slot 45 cut or milled circumferentially in the central portion of the outer bushing 23; the two slots 45, 45 of said bushing being substantially 180° apart on such circumference so as to receive the two similarly-located tongues 44, 44 of the headed members 42, 42. The bushings 37 and 38 are so adjusted as to force the tongues 44, 44 to bottom substantially in the associated slots 45, 45 of the bushing 23, and thus said bushing 23, 23 and the arm 16 are constrained to always move angularly in unison about the axis of shaft 12, being in effect locked together against any relative rocking movement about said axis. Notwithstanding this there is freedom for the arm 16 to have a limited rectilinear motion, relative to the bushing 23, in the direction of the radial length of the arm, this being permitted by the aforesaid enlarged hole 36 and by the slidability of the tongues 44, 44 in the slots 45, 45 of the bushing. Furthermore, on an axis transverse to the axis of the shaft 12, the arm 16 can have a limited rocking movement relative to the bushing 23, this rocking or angular movement occurring as the aligned stems 41, 41 of the heads 42, 42 turn within the aligned and fixed bushings 37 and 38.

The usual and normal position of the radial arm 16 is as illustrated in Fig. 2 with said arm hanging down substantially vertical from the bushing 23 and with the handle 15 in the lowest point of its swing about the axis of shaft 12. In this normal and usual position, under the weight of the arm 16 and handle 15, the aforesaid relative rectilinear movement by the said arm and the bushing 23 has taken place in a downward direction to the full extent permitted by said arms encirclement of the bushing 23, that is, until said bushing 23 is contacted topside by the inner periphery of the ring-like enlargement 36 at a point on the latter which lies substantially at the top of the bushing 23 as is disclosed in Fig. 11. This contact point on the ring-like enlargement 36 is preferably provided by a hardened steel washer 46, received in a recess 47 of the enlargement 17 and attached thereto in any suitable manner, as by a screw 48; the washer 47 carried midway of the members 41, 41 has its rim slightly overhanging the inner periphery of opening 36 of enlargement 17 and thus produces a wear and impact resisting surface for engagement with the bushing 23, the latter, in the zone of contact and impact by said washer 46 being formed with a narrow slot 49, for the purpose to be hereinafter described.

According to my invention the aforesaid rocking movement of handle carrying arm 16 relative to bushing 23, on the transverse axis provided by the aligned stems 41, 41 of the members 42, 42 is utilized for the establishment of a clutching connection by the said arms 16 and the hand wheel 13 so as to make possible the manual turning of shaft 12 by the crank or handle 15 when the clutching connection has been established. For purposes of such clutching, the wheel rim 18 is provided on the inner face 50 opposing the arm 15 with a circular series of holes 51, 51 adapted for the reception, when certain conditions have been fulfilled, of an abutment, or abutments, 52, 52 carried by the arm 16 and projecting toward said wheel rim. In the drawings (see Fig. 1), I have shown the arm 16 as having two such abutments or projections 52, 52, and have shown the wheel rim as having a plurality of pairs of similarly-spaced holes 51 for the selective reception of said abutments 52, 52 but it is obvious that one abutment on the arm 16 for selective engagement with any one of a series of holes in the wheel rim could as well be employed.

The wheel rim holes 51, 51 are at a fixed radial distance from the axis of shaft 12 but the radial distance from said axis of the abutments 52 is variable being dependent upon the angular position about said axis occupied by the arm 16. That is to say, when said arm 16 hangs down by gravity (see Fig. 11) in the lowest position, at which time the bushing 23 in supporting said arm is contacted topside (preferably in slot 49), then the abutment or abutments 52 are at a greater radial distance from the shaft axis than the hole or holes 51, 51, and cannot, by an rocking of the member 16 on the transverse axis afforded by the aligned stems 41, 41, be registered with any hole or holes 51, 51 even though the latter be in the same angular position as said abutments; the reason being that the takeup in this direction of the aforesaid radial play between the bushing 23 and the handle carrying member 16 disposes the abutments 52 slightly beyond and below the position of exact registration with the holes 51. However, when by the operator's seizure and swinging of the handle 15, the member 16 and with it the bushing 23 is turned to an angular position 180° removed from that as shown in Fig. 2, so that an opposite point from the washer 46 makes topside contact with the bushing 23 in a zone 180° distant from the latter's slot 49, then the takeup of said radial play works oppositely, to so reduce or decrease the radial distance of the abutments 52 from the axis of shaft 12 that upon rocking of member 16 on the transverse axis afforded by the stems 41, 41, the abutments 52 can and will be registered radially (see Fig. 7) with a pair of holes 51 having the same angular position.

It will be noted that for the purpose of this other topside support (see Fig. 7) of member 16 on bushing 23 the contact point on the ring-like enlargement 17 is preferably provided by a hardened steel washer 53, received in a suitable recess 54 of the enlargement 17 and attached thereto in any suitable way as by a screw 55; the washer 53 is 180° distant from the washer 46 and has its rim slightly overhanging the inner periphery of opening 36 to provide a wear and impact resisting surface for engagement with the bushing 23 the latter in this zone of contact and impact being formed with a shallow slot 56 which is 180° distant from the slot 49. It will be noted further that the above described two washers 46 and 53 are in opposite surfaces of the ring-like enlargement 17, the washer 46 being on the inner surface, and the washer 53 being on the outer surface.

When the parts are in the position shown in Fig. 2, the washer 46 bottoms naturally in the slot 49, and under these conditions with gravity maintaining the interengagement between the washer 46 and slot 49, there is established a positive stop against any rocking of the member 16 about the aforesaid transverse axis afforded by the aligned stems 41, 41. This stop prevails even though the projecting handle be seized and pulled in an attempt to rock the member 16 counterclockwise about said transverse axis; any such movement is prevented by the interengagement by the washer 46 and bushing slot 49, and thus the abutments 52, 52 of the handle carrying member 16 are maintained in this normal and natural position of said member, in spaced relation to the wheel rim 18, as shown in Fig. 11; it being evident that not only are said abutments disposed radially in non-registering relation to the holes 51, 51 of the wheel rim 18, but also that said abutments cannot be moved either accidentally or intentionally in the direction of the wheel rim because of the aforesaid engagement between the bushing slot 49 and the washer 46 that locks the member 16 in the position as shown in Fig. 2.

Such interlock or stop, inhibiting any rocking of member 16 on the aforesaid transverse axis when the parts are in the normal and natural position shown by Fig. 2, is automatically eliminated when handle 15 is seized and swung to carry the arm 16 and the bushing 23 around and up to an angular position (see Fig. 7) which is 180° removed from Fig. 2. When the parts are so swung or turned, gravity makes the radial play between them effective to disengage the washer 46 from the bushing slot 49 and transfers the support of member 16 to the point of contact between its washer 53 and the shallow bushing slot 56; as previously described, this contact supports the arm 16 at such a level that its abutments 52, 52 are in the same radial distance from the axis of the shaft as the hole or holes 51, 51 of the wheel face 50 thus gravity is made to establish a condition under which clutching engagement can be made between the members 16 and the wheel 13 (through the agency of abutments 52 and the holes 51) upon a clockwise rocking of member 16 about said transverse axis, as the result of such swinging or turning of the parts upwardly into the position shown in Fig. 7, having been slightly but appreciably elevated relative to bushing 23 and shaft 12 through a sliding movement of tongues 41, 41 and their associated slots 45, 45.

Figures 6, 7:
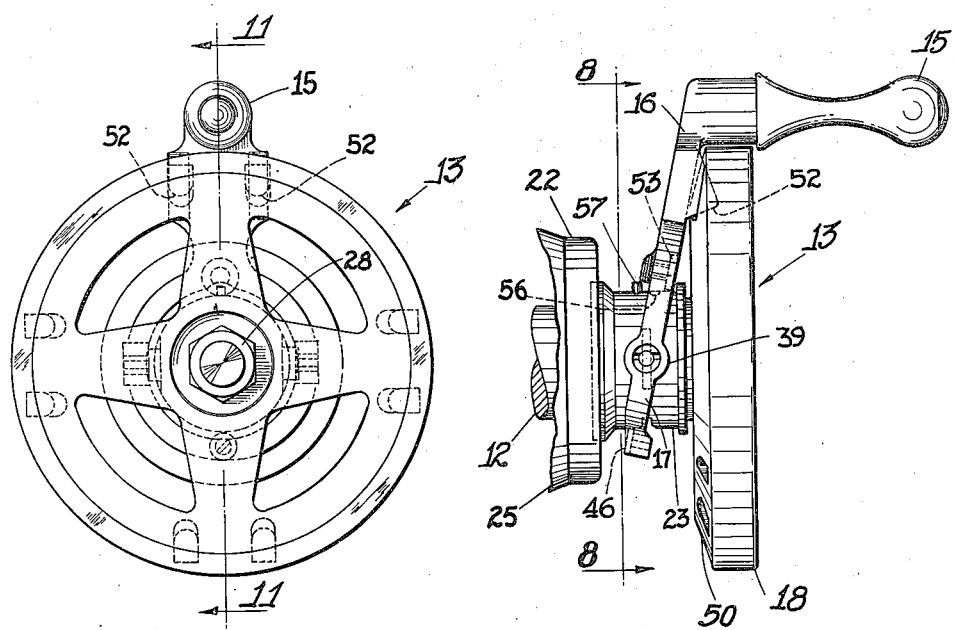
Fig. 6 represents a front elevation of the device as shown in Fig. 1 but with the handle or crank portion thereof illustrated in its operative or clutching position.
Fig. 7 represents a left sided view of the device disclosed in Fig. 6.
Figures 9, 10:
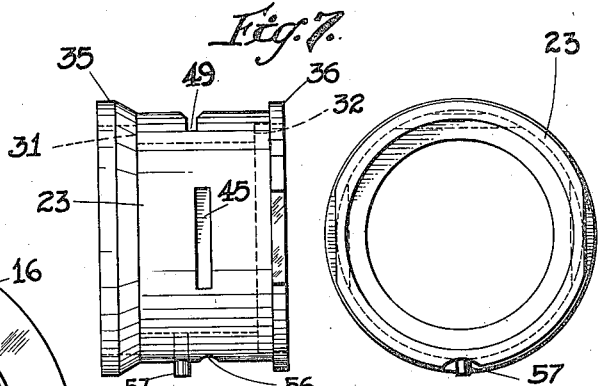
Fig. 9 represents a side elevation of a bushing used in the present device.
Fig. 10 represents a right hand view of the bushing disclosed in Fig. 9.

The bottoming of washer 53 in the slot 56, unlike the bottoming of washer 46 in slot 49, does not inhibit the rocking of arm 16 about such transverse axis; on the contrary, the slot 56 by a very shallow arcuate section allows for the free lateral movement turn of the washer 53, when any rocking movement of the arm 16 is made to take place about said transverse axis. In a counterclockwise direction there is preferably a positive stop against such rocking movement, in the form of a pin 57 projecting outwardly from the bushing 23 in the vicinity of the shallow slot 56 and on the inner side thereof, but clockwise rocking movement of member 16 about this transverse axis, when said member occupies the angular position shown in Fig. 7, is unimpeded. Thus, assuming that the wheel 13 presents its holes 51, 51 in the same angular position the abutments 52, 52 of member 16, it is possible for the operator, by pulling outward by the elevated handle 15 to enter said abutments in said holes and thus to establish a clutching connection between said crank or handle and the shaft 12 to which the wheel is secured. In this way, and only this way, after moving the handle or crank and its carrying member 16 to the top of the swing (Fig. 7) and after pulling outwardly to interengage the potentially rigid abutments and apertures, respectively, can the manual cranking of said shaft by said handle be effected. Referring to Fig. 2, the abutments 52 are each provided at its outer side with a camming surface 58 which is made effective, under the force of gravity acting upon the handle 15 and arm 16, to separate the abutment from its associated hole 51 whenever the operator releases his hold upon the handle 15 when the handle is in its lower and locked position. Thus, no matter when the operator releases the handle 15, it will always drop to its lower position and then be rocked, under the force of gravity and with the assistance of the camming surface 58, 58, away from the wheel thereby to assume the position illustrated in Fig. 2. It is to be understood therefore, that the present device is entirely foolproof as the operator can never inadvertently leave the arm 16 locked with the wheel 13 as the device will automatically uncouple itself under the force of gravity.

I claim:

1. In a safety cranking device for a rotatable shaft, a handle-carrying member extending radially of said shaft and mounted thereon for free turning movement substantially about the shaft axis and for rocking movement about an axis transverse to said shaft axis, there being matching projections and depressions associated with said member and shaft respectively, and adapted when in registration angularly and radially to be interengaged by said rocking movement for the clutching together of member and shaft, to procure cranking of the latter by the former, said mounting permitting radial play between said member and shaft of such amplitude as to preclude such radial registration when said member is pendent from the shaft, in the lower half of its swing, and to obtain such radial registration when said member is moved into the upper half of its swing to rest upon said shaft.

2. In a safety cranking device for a rotatable shaft, a member extending radially of said shaft and carrying a projecting handle at its other end, the inner end of said member encircling said shaft and mounted for free turning movement thereon, and for limited rocking movement about an axis transverse to the shaft axis, interengageable means associated with shaft and member respectively, and adapted to be rendered operative by said rocking movement in one direction, for establishing a driving connection between said shaft and said handle-carrying member, said member's encirclement of said shaft affording radial play of such amplitude as to preclude interengagement of said interengageable means whenever said handle is at its greatest radial distance from said shaft and to permit such interengagement whenever said handle is at the least radial distance from said shaft, and said member normally being maintained by gravity in such a position that said interengageable means are rendered inoperative.

3. In a safety cranking device for a rotatable shaft, a hand wheel fast to said shaft, an associated handle member extending radially of said wheel and mounted for free turning movement substantially about the shaft axis and for rocking movement about an axis transverse to the shaft axis, the wheel having a circular series of depressions and the handle member having a projection adapted when brought into angular and radial registration with one of said depressions to be interengaged therewith by said rocking movement, for the clutching together of handle member and wheel to procure cranking of said shaft by said handle member, said mounting providing play of said member in the direction of its length of such amplitude as to preclude such radial registration when said member is pendent from the shaft, in the lower half of its swing and to obtain such radial registration when said member is moved into the upper half of its swing to rest upon said shaft.

4. In apparatus of the class described, adapted for manual cranking of a rotatable shaft, a member extending radially of said shaft and carrying a projecting handle at its outer end, the inner end of said member encircling said shaft and mounted for free turning movement thereon, and for limited rocking movement about an axis transverse to the shaft axis, interengageable means associated with shaft and member respectively, and adapted to be rendered operative by said rocking movement in one direction, for establishing a driving connection between said shaft and said handle-carrying member, the latter when pendent from the shaft and in driving relation therewith being rocked by gravity in the opposite direction thereby to break said driving connection and said member's encirclement of said shaft affording radial play of such amplitude as to preclude interengagement of said interengageable means in the said pendent position of said member and to permit such interengagement by rocking on said transverse axis when said member is swung up above the shaft to rest by its encircling portion thereon.

5. In apparatus of the class described, adapted for manual cranking of a rotatable shaft, a member extending radially of said shaft, and carrying a projecting handle at its outer end, the inner end of said member encircling said shaft and mounted for free turning movement thereon, and for limited rocking movement about an axis transverse to the shaft axis, interengageable means associated with shaft and member respectively, and adapted to be rendered operative by said rocking movement in one direction, for establishing a driving connection between said shaft and said handle-carrying member, said member's encirclement of said shaft affording radial play of such amplitude as to preclude interengagement of said interengageable means in the said pendent position of said member, and to permit such interengagement by rocking on said transverse axis when said member is swung up above the shaft to rest by its encircling portion thereon.

6. In apparatus of the class described, adapted for manual cranking of a rotatable shaft, a member extending radially of said shaft, and carrying a projecting handle at its outer end, the inner end of said member encircling said shaft and mounted for free turning movement thereon, and for limited rocking movement about an axis transverse to the shaft axis, interengageable means associated with shaft and member respectively, and adapted to be rendered operative by said rocking movement in one direction, for establishing a driving connection between said shaft and said handle-carrying member, the latter when pendent from the shaft and in driving relation therewith being rocked by gravity in the opposite direction thereby to break said driving connection, and said member's encirclement of said shaft affording radial play of such amplitude as to preclude interengagement of said interengageable means in the said pendent position of said member, and to permit such interengagement by rocking on said transverse axis when said member is swung up above the shaft to rest by its encircling portion thereon, the rocking of said member in this last-mentioned position being in a direction to procure interengagement of said interengageable means.

7. In a safety cranking device for a rotatable shaft, a hand wheel fast to said shaft, an associated handle member extending radially of said wheel and mounted for free turning movement substantially about the shaft axis and for rocking movement about an axis transverse to the shaft axis, interengageable means associated with said handle member and said wheel respectively, said means being adapted when brought into angular and radial registration together by said rocking movement, for the clutching together of handle member and wheel to procure cranking of said shaft by said handle member, said mounting providing play of said member in the direction of its length of such amplitude as to preclude such radial registration when said handle member is at its greatest radial distance from said shaft, and to obtain such radial registration when said handle member is at the least radial distance from said shaft, and means made effective by gravity to render said interengageable means normally ineffective.

8. In a safety cranking device for a rotatable shaft, a hand wheel fast to said shaft, a bushing loosely mounted upon said shaft, a handle member extending radially of said wheel and mounted upon said bushing for rocking movement about an axis transverse to the shaft axis and for limited radial movement relative to said bushing, interengageable means associated with said handle member and said wheel respectively, said means being adapted when brought into angular and radial registration together by said rocking movement, for the clutching together of handle member and wheel, and means associated with said handle member for preventing said rocking movement whenever said handle member is at its greatest radial distance from said shaft.

9. In a safety cranking device for a rotatable shaft, a hand wheel fast to said shaft, an associated handle member extending radially of said wheel and mounted for free turning movement substantially about the shaft axis and for rocking movement about an axis transverse to the shaft axis, the wheel having a circular series of depressions and the handle member having a projection adapted when brought into angular and radial registration with one of said depressions to be interengaged therewith by said rocking movement, for the clutching together of handle member and wheel to procure cranking of said shaft by said handle member, said mounting providing a play of said member in the direction of its length of such amplitude as to preclude such radial registration when said handle member is moved to its outermost position relative to said shaft, and to obtain such radial registration when said handle member is moved to its innermost position relative to said shaft, and means made effective by gravity to prevent normally the registration of said projections within said depressions.

10. In a safety cranking device for a rotatable shaft, a hand wheel fast to said shaft, a bushing loosely mounted upon said shaft, a handle member extending radially of said wheel and mounted upon said bushing for rocking movement about an axis transverse to the shaft axis and for limited radial movement relative to said bushing, said wheel having a circular series of depressions and the handle member having a projection adapted when brought into angular and radial registration with said depressions to be interengaged therewith by said rocking movement, for the clutching together of handle member and wheel to procure cranking of said shaft by said handle member, the amplitude of said radial movement being such as to preclude such radial registration when said handle member is pendent from said bushing, in the lower half of its swing and to obtain such radial registration when said member is moved into the upper half of its swing to rest upon said bushing, and means associated with said bushing for preventing any rocking movement of said handle member whenever the latter is pendent from said bushing.

11. In a safety cranking device for a rotatable shaft, a hand wheel fast to said shaft, a stationary sleeve disposed about said shaft, a bushing loosely mounted upon said stationary sleeve, a handle member extending radially of said wheel and mounted upon said bushing for rocking movement about an axis transverse to the shaft axis and for limited radial movement relative to said bushing, interengageable means associated with said handle member and said wheel respectively, said means being adapted when brought into angular and radial registration together by said rocking movement, for the clutching together of handle member and wheel, and means associated with said handle member for preventing said rocking movement whenever said handle member is at its greatest radial distance from said shaft.

12. In a safety cranking device for a rotatable shaft, a stationary quill in which said shaft is rotatably journaled, a stationary sleeve extending from said quill and about said shaft, a hand wheel fast to said shaft, a bushing loosely mounted upon said sleeve, a handle member extending radially of said wheel and mounted upon said bushing for rocking movement about an axis transverse to the shaft axis and for limited radial movement relative to said bushing, interengageable means associated with said handle member and said wheel respectively, said means being adapted when brought into angular and radial registration together by said rocking movement, for the clutching together of handle member and wheel, and means associated with said handle member for preventing said rocking movement whenever said handle member is at its greatest radial distance from said shaft.

FRANK J. GIBBONS.

REFERENCES CITED

The following references are of record in the file of this patent:

UNITED STATES PATENTS

| Number | Name | Date |
|--------|------|------|
| 53,621 | Hoyt | Apr. 3, 1866 |
| 56,275 | Rymond | July 10, 1866 |